J. W. DONALDSON.
SPECTACLES.
APPLICATION FILED NOV. 9, 1909.

956,690.

Patented May 3, 1910.

WITNESSES:
Ernest C. Gery.
Mabel Emery.

INVENTOR
James W. Donaldson
BY
Hardway & Cathey,
ATTORNEYS.

UNITED STATES PATENT OFFICE.

JAMES W. DONALDSON, OF HOUSTON, TEXAS.

SPECTACLES.

956,690.  Specification of Letters Patent.  Patented May 3, 1910.

Application filed November 9, 1909. Serial No. 526,956.

*To all whom it may concern:*

Be it known that I, JAMES W. DONALDSON, a citizen of the United States, residing at Houston, in the county of Harris and State of Texas, have invented certain new and useful Improvements in Spectacles, of which the following is a specification.

My invention relates to new and useful improvements in spectacles and more particularly to that type which are adapted solely for reading and similar near vision use.

The object of the invention is to provide spectacles comprising lenses arranged in such relation to their supporting members as to be constantly maintained below the eyes of the user and thus afford a clear vision of objects at the normal line of sight above the lenses, at the same time presenting said lenses in proper position to be used for reading or similar purposes requiring the down cast vision of the user.

A further object of the invention is to provide a construction whereby the coincidence of the top of the lens or its supporting frame and the line of vision is obviated.

Figure 1:
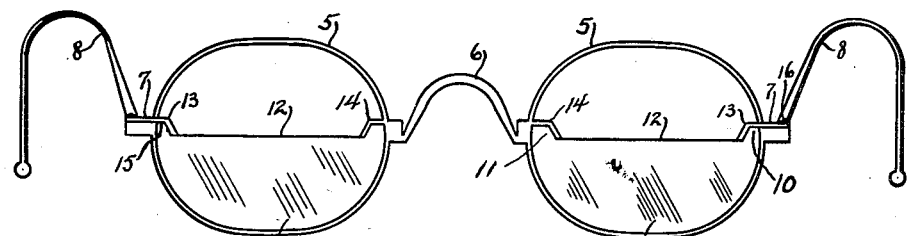
Figure 3:
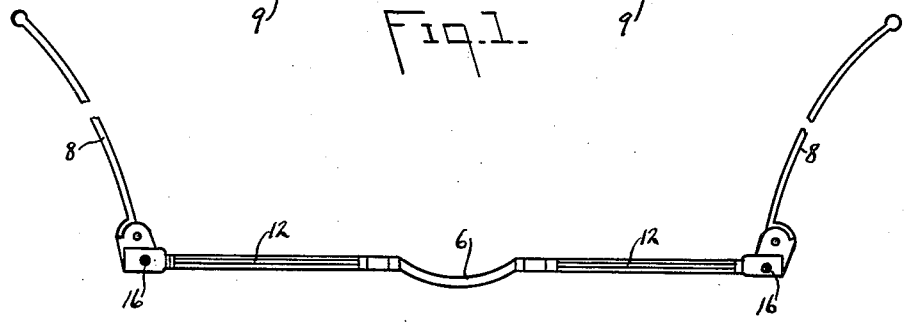
Figure 2:
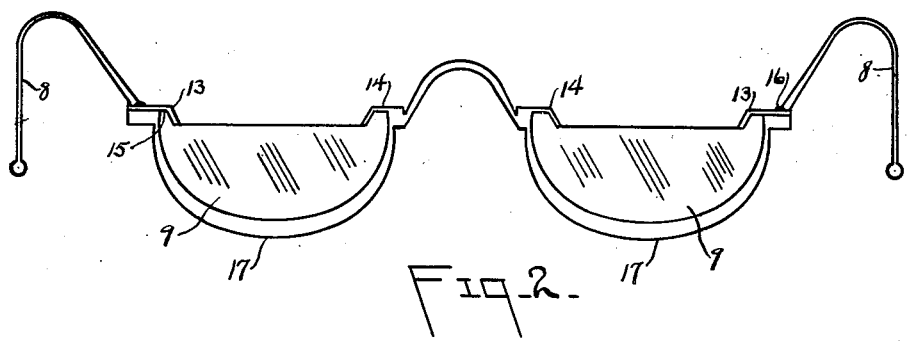

With the above and other objects in view my invention has particular relation to certain novel features of construction, arrangement and combination of parts, an example of which is described in this specification and illustrated in the accompanying drawings, wherein:

Figure 1 is a front elevation of a pair of spectacles constructed in accordance with the invention, the lens supporting member being of the ordinary formation; Fig. 2 is a similar view with the lens supporting frame members of substantially semi-elliptical formation; Fig. 3 is a top plan view of the form shown in Fig. 2.

Referring now more particularly to the drawings, wherein like numerals of reference designate similar parts in each of the figures, the numeral 5 refers to a pair of rims connected together by a nose bridge 6, said rims and bridge comprising the main frame of the spectacles as shown in Fig. 1. The outer end of each rim 5 is provided with an outwardly and rearwardly projecting shoulder 7 in which the bows 8 are pivotally mounted. The nose bridge 6 connecting the rims 5 is of the usual and well known construction.

Mounted in each of the rims 5 are the lenses 9 which lenses are mounted in the lower portion of the rim 5 by a suitable engagement between said rim and its lower edge throughout the entire extent of said lower edge, said engagement being provided for, preferably by a grooved lower portion of the rim in which the lower edge of the lense engages. The terminations of each lower edge of the lenses 9 are disposed slightly above the longitudinal axis of the rim in which it is mounted while the upper edge of each lens is formed of the horizontal portions 10 and 11 extending a slight distance inwardly from each side, while the central portion of said lens presents a horizontal edge 12 slightly below the horizontal line of the portions 10 and 11, the said lenses thus being provided at either end with upwardly projecting shoulders whose inner sides preferably diverge outwardly from the line 12 to the edges 10 and 11. It should be noted that the edge 12 of the lenses may be concaved if it is so desired. Projecting inwardly from corresponding points at each end of the rims 5 are the prongs 13 and 14 which are shaped so as to conform closely to the free edges of said upwardly projecting shoulders and have the under side of their horizontal portion grooved as at 15 to receive the horizontal portions 10 and 11 of the upper edge of the lens 9.

It is to be observed that the shoulder 7 is composed of two members which are secured together by a suitable set screw 16 which passes through a tapped hole in the upper section thereof and engages with the lower section. The prongs 13 are integral with the upper section of said shoulder and when the lens 9 is placed within the rim the grip of the prongs 13 thereon can be regulated by the tightening or loosening of said set screw.

From the construction just described it will be obvious that the lens 9 will be securely mounted in the rim 5 and by reason of the depression of the upper edge thereof the same will be removed from the line of vision of the user when the eye is elevated for the purpose of viewing distant objects.

In the construction shown in Figs. 2 and 3 the upper portion of the rim 5 is removed while the lower portion is reinforced as at 17 so as to increase the firmness of the rim, to prevent any lateral spreading of the same, and to compensate for the removal of the upper portion thereof. In all other respects the structure disclosed in Figs. 2 and 3 is identical with what is shown in Fig. 1; the same reference characters utilized in Fig. 1 being applied to similar parts in Figs. 2 and 3.

While the invention has been shown and described as applied to spectacles it is obvious that the same may be utilized with equal facility in the construction of pendent eye glasses and also that various modifications of the invention may be resorted to without in any manner departing from the scope of the invention.

What I claim is:

1. An eye glass comprising a nose bridge, a semi-elliptical frame mounted on each side of said nose bridge, a lens mounted in each frame and having its upper edge disposed beneath the normal line of vision and also being provided with upwardly projecting shoulders at each end, and a pair of prongs formed on each frame extending inwardly thereof and engaging with the said shoulders, so as to prevent the lateral spreading of said frames.

2. An eye glass comprising a nose bridge, a semi-elliptical frame mounted on each side of said nose bridge, each frame being reinforced at its central portion, a lens mounted in each frame and having its upper edge disposed beneath the normal line of vision and also being provided with upwardly projecting shoulders at each end, and a pair of prongs formed on each frame extending inwardly thereof and engaging with the said shoulders, so as to prevent the lateral spreading of said frames.

3. An eye glass comprising a nose bridge, a semi-elliptical frame mounted on each side of said nose bridge, a lens mounted on each frame and having its upper edge disposed beneath the normal line of vision, shoulders carried by each end of the said lens and means carried by the frame for engaging with the shoulders to prevent the lateral spreading of said frame.

In testimony whereof I have signed my name to this specification in the presence of two subscribing witnesses.

JAMES W. DONALDSON.

Witnesses:
CHAS. R. MUNGER,
E. C. GUY.